United States Patent [19]

Blackborow et al.

[11] Patent Number: 4,547,925
[45] Date of Patent: Oct. 22, 1985

[54] CARRIER FOR A WINDSCREEN WIPER BLADE

[76] Inventors: Malcolm H. Blackborow, 10 Clarence Rd. North, South Benfleet, Essex; Marlyn Langley, 58 Barncroft Close, Loughton, Essex, both of England

[21] Appl. No.: 380,740
[22] PCT Filed: Sep. 7, 1981
[86] PCT No.: PCT/GB81/00181
 § 371 Date: May 11, 1982
 § 102(e) Date: May 11, 1982
[87] PCT Pub. No.: WO82/00982
 PCT Pub. Date: Apr. 1, 1982

[30] Foreign Application Priority Data

Sep. 12, 1980 [GB] United Kingdom ............... 8029643
Oct. 6, 1980 [GB] United Kingdom ............... 8032071
Jan. 19, 1981 [GB] United Kingdom ............... 8101500

[51] Int. Cl.⁴ ............................................. B60S 1/04
[52] U.S. Cl. ............................ 15/250.42; 15/250.39
[58] Field of Search .......... 15/250.32, 250.36, 250.39, 15/250.42

[56] References Cited

U.S. PATENT DOCUMENTS

| 2,663,043 | 12/1953 | Oishei | 15/250.42 X |
| 2,713,695 | 7/1955 | Oishei | 15/250.39 |
| 2,772,436 | 12/1956 | Deibel | 15/250.42 |
| 3,922,749 | 12/1975 | Castleman, Jr. et al. | 15/250.42 |
| 4,180,885 | 1/1980 | Thornton et al. | 15/250.32 |
| 4,336,625 | 6/1982 | Maiocco | 15/250.42 |

Primary Examiner—Edward L. Roberts

[57] ABSTRACT

A windscreen wiper blade carrier comprising a bowed stem with means for engaging a wiper arm, socket means at each tip and resilient snap-engaged support means comprising retainers for engagement with a blade. The carrier is adjustable at both ends so as to permit the attachment to the carrier of refill wiper blades of a plurality of different lengths. In one embodiment the tips of the carrier may be formed with longitudinally spaced socket means separated by lines of weakness to allow portions of the carrier to be broken off. It is preferred to form the end portions of the carrier as separate members which are telescopically received by the main carrier portions, there being cooperating means for locking the end portions in one of a plurality of predetermined positions to in one of a plurality of predetermined positions to adjust the effective length of the carrier.

14 Claims, 8 Drawing Figures

CARRIER FOR A WINDSCREEN WIPER BLADE

The present invention relates to a carrier for a windscreen wiper. The carrier of a windscreen wiper for a motor vehicle is normally an elongate metal member which is detachably connectable to an arm which in turn is more permanently attached to a motor on the motor vehicle. The carrier has means for attachment to a wiper blade which in turn is an elongate piece of resiliently flexible material, normally rubber, which is strengthened by a steel backing strip. The rubber blades get worn in the course of service and need to be replaced. Replacement blades are normally sold ready-attached to a carrier, mainly for the reason that it is a comparatively easy operation to change a complete windscreen wiper comprising carrier and blade, while it is rather more difficult to fit a blade to a carrier where it has to be supported at each end and at intermediate points. However the differences from one motor vehicle to another mean that wiper replacements have to be stocked in a great number of sizes which is a difficult retailing problem and adds to the expense of the replacement unit.

The invention is aimed at reducing the number of carriers required to cover the full range of windscreen wipers.

In accordance with the invention there is provided a windscreen wiper blade carrier which is adjustable at both ends so as to permit the attachment to the carrier of refill wiper blades of a plurality of different lengths.

Preferably the carrier comprises socket means at each tip constructed so as to permit the attachment to the carrier refill wiper blades of a plurality of different lengths.

The main embodiment of the invention which is described hereafter is based upon a carrier comprising a rigid bowed stem. However if desired the carrier may be formed in a plurality of flexibly linked sections. Carriers of this type are known in which the carrier is formed in two hinged sections with the blade conforming generally to the contour of the carrier, the hinge sections being resiliently stressed in the direction of the chord so that the wiper blade conforms to the contour of the windscreen. In the description which follows it will become apparent that the construction of the end portions of the rigid carrier may be readily adapted to a flexible carrier.

In accordance with a preferred form of the invention there is provide a carrier for a windscreen wiper comprising a rigid bowed stem with means for engaging a wiper arm and having a chord length corresponding generally with the length of a wiper blade, socket means at each tip for receiving a respective end of a wiper blade, support means extending from the stem towards the chord for engaging a wiper blade at at least two points intermediate of the tips, the support means comprising respective retainers for engaging with a blade at the said points to resist lateral bowing of a fitted blade and to provide resilient force to press such blade against a windscreen, wherein the socket means are constructed to allow the fitting of blades of a plurality of different lengths.

Preferably the support means comprise resilient arms. However they could be provided e.g. by rigid arms with a spring connection to the stem. The stem may be of channel shape, open to the chord. It may have a central aperture fitted with a pin for receiving a wiper arm tip in the normal way and the support means may comprise a member having a pair of spring arms joined by generally parallel webs formed to seat within the aperture. The webs may each have a recess formed to snap-engage with the pin to hold the support member in position.

In the preferred case, the end portions of the stem are separate from a main stem portion and are telescopically received by the main stem portion, each end of the main stem portion and its corresponding end portion comprising cooperating means for locking the end portion in one of a plurality of predetermined positions to adjust the effective length of the stem. Each stem end portion may be of channel shape and received within the channel of the main stem portion, the latter comprising at least one flange at each end to partly enclose the corresponding end portion.

In the preferred embodiment the locking means comprises a row of equally longitudinally spaced cooperating projections and recesses by which each end portion can snap-engage with the main stem portion in different portions. Preferably the projections project inwards from both channel side walls of the main stem portion to engage with recesses on the side walls of the end portion. Preferably the sockets are formed as dimples.

In an alternative arrangement, the locking means may comprise a movable pin connected to each end of the main portion and receivable in one of a row of holes in each stem end portion.

In another embodiment each tip of the stem may be formed with a plurality of longitudinally spaced socket means separated by lines of weakness to allow unwanted end portions of the stem to be broken off.

Embodiments of the invention are hereafter described with reference to the accompanying drawings, in which.

Figure 1:
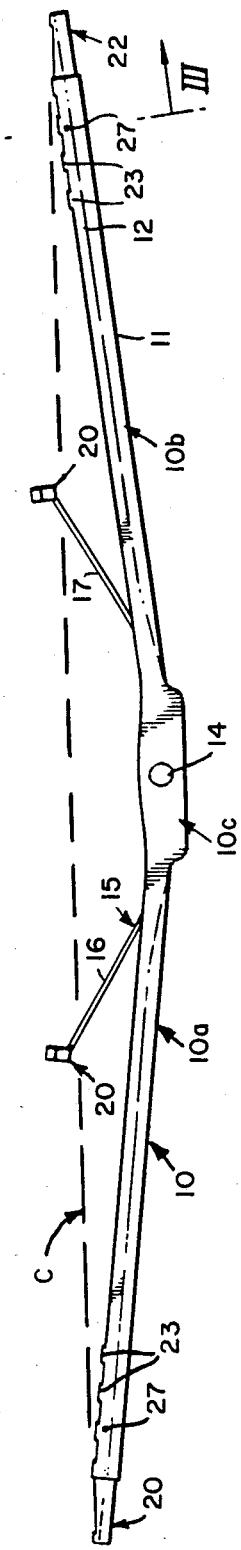
FIG. 1 is a side elevational view of a carrier in accordance with the invention.
Figure 2:
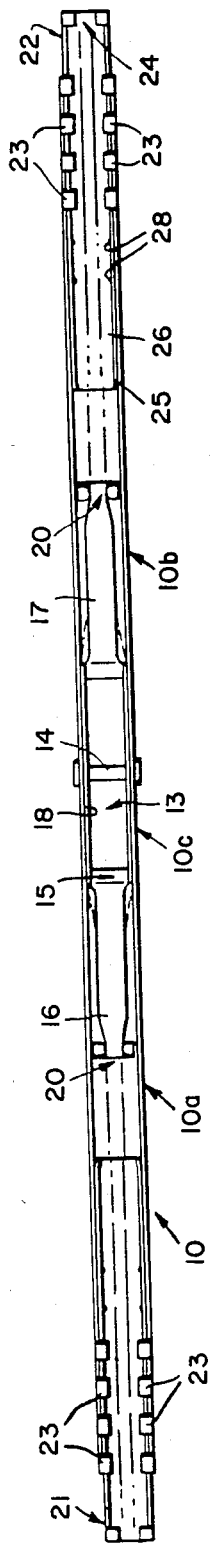
FIG. 2 is a plan view, viewed from the chord, of the carrier of FIG. 1.
Figure 3:
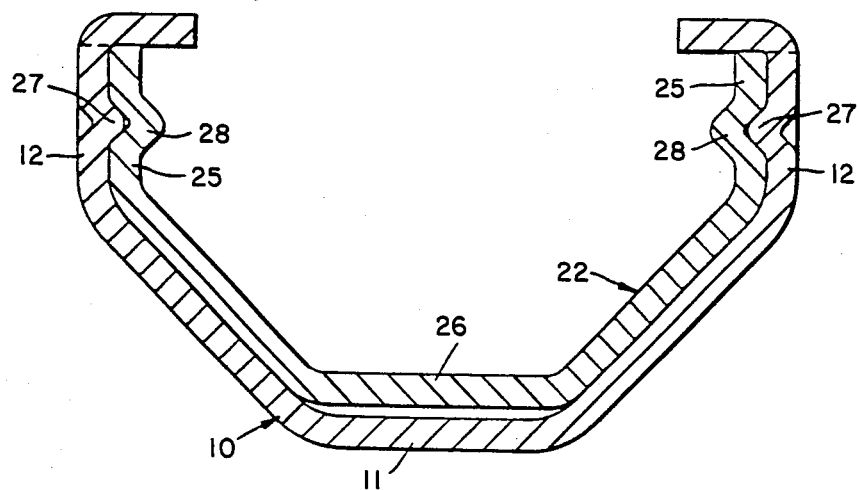
FIG. 3 is a section along the line III—III of FIG. 1.

In FIGS. 1 to 6 the carrier shown generally in FIG. 1 comprises a rigid bowed stem 10 of channel shape having a back portion 11 and side walls 12, the channel being open to the chord C. Although the stem may have a curved bow, in this embodiment the bow is formed by rectilinear arms 10a, 10b arranged to extend at a dihedral angle of about 10° from a central connection portion 10c which is formed with an aperture 13 between the side walls 12. A pin 14 extends across the aperture in a conventional manner for receiving a wiper arm tip and may be e.g. riveted in place between the side walls 12 which are formed with suitable bores. The main stem member constituted by portions 10a, 10b and 10c, may be formed of pressed steel.

Figure 4:
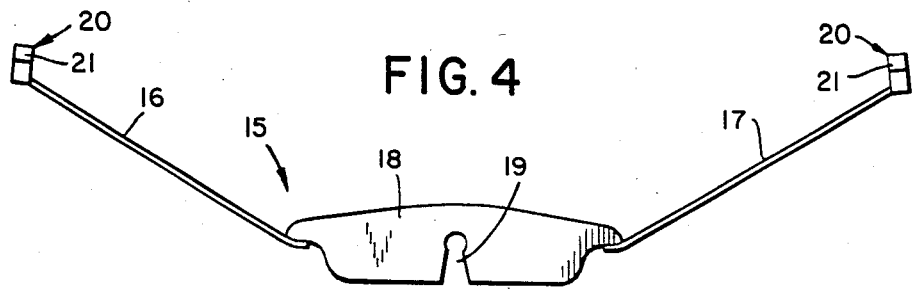
FIG. 4 is a side elevational view corresponding to FIG. 1 of the support member.
Figure 5:
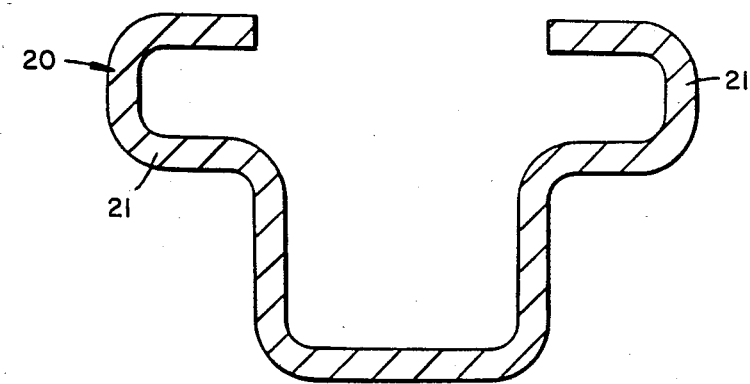
FIG. 5 is an end view of one of the support blades.

Mounted within the recess 14 is a support member 15 shown in more detail in FIG. 4. This member may also be formed of pressed steel and comprises a pair of spring arms 16,17 joined by generally parallel webs, one of which is shown at 18. The webs have recesses 19 which are generally keyhole-shaped to enable the member 15 to be snap-engaged in the aperture 13 around the pin 14. At the end of each arm 16,17 is a fastening means 20, shown in more detail in FIG. 5, which is generally of channel shape with claws 21 at the ends of the side walls to engage and hold the steel backing strip of a rubber wiper blade.

The purpose of the support means is to engage the wiper blade at two points intermediate of the tips of the carrier to resist lateral bowing of the fitted blade and to provide the necessary resilient force to press the blade against a curved windscreen over its full length.

Figure 6:
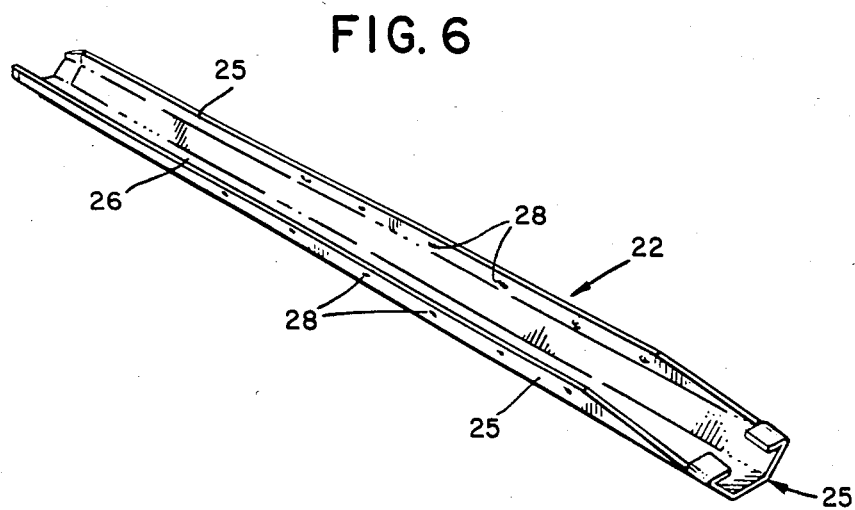
FIG. 6 is a perspective view of an end portion of the carrier illustrating the means for adjusting and locking the tip portions.

End portions of the stem 10 are formed as separate members 21,22, one of which 22 is shown in more detail in FIG. 6 and will be described. The members 21 and 22 are mirror images one of the other as will be apparent. The member 22 is also preferably of pressed steel and is of channel section corresponding to that of stem portion 10b. It is telescopically received into the end of the portion 10b and partially enclosed by flanges 23 in spaced positions at the ends of the portions 10a and 10b as shown more clearly in FIG. 2. At the end of the extendable portion 22 is a claw 24 formed by flanges in side walls 25 of the portion 22. The side walls 25 are connected by a web 26.

The portions 22 may be telescopically withdrawn from the main stem portion by equal increments so that the effective length of the carrier can be adjusted to suit different blade sizes required for different motor vehicles. Means are provided for locking the extendable portions 22 at different predetermined positions and in this embodiment this is provided by rows of inter-engaging dimples on the main stem portion and the extendable portions. Thus a row of dimples formed to constitute projections 27 is formed in each side wall 12 so that pairs of projections face each other across the channel. These projections 27 engage within complementary recesses 28 formed by inwardly projecting dimples in the side walls 25 of the extendable stem portions 21,22 as shown particularly in FIG. 6. The dimples on both portions may be spaced e.g. 10 mm apart so that by extending each extendable portion 21,22 by one increment, the effective length of the carrier may be extended by 20 mm to the next size of blade. Naturally, however, the spacing and positioning of the dimples will be suited to the prevailing range of blade sizes. The inner end of the extendable portion 22 may be tapered as shown to provide a convenient lead-in and the outward or tip end may have chamfered side walls leading to the claw 24 which should of appropriate height from the web 26 to grip the end of a blade.

The inter-engaging projections 27 and recesses 28 engage along the row by snap fitting, making use of the resilient qualities of the channel sections involved. The inter-engagement may be sufficiently firm to require the use of tools if desired since, normally, the correct adjustment of length will be performed as part of the manufacturing or packaging operation prior to retailing and not by the eventual customer. However as practices change, the tolerances may be such as to provide the facility of adjustment by hand by the eventual customer.

Figure 7:
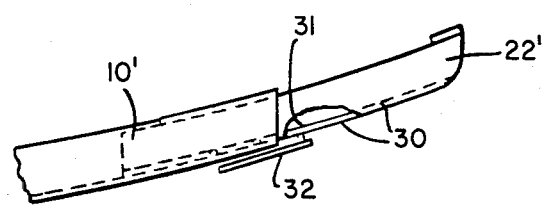
FIG. 7 is a side elevational view of part of a second embodiment of carrier.

Turning to FIG. 7 there is shown an embodiment in which the inter-locking dimples of the previous embodiment are replced by a series of holes 30 in the web of the extendable portion which is marked 22' and which can be engaged by a pin 31 formed on an arm 32 which is connected to the end of the main stem portion 10' e.g. by a riveted connection which allows the arm to swivel. By lifting the end of the arm and pin the portion 22 can be withdrawn or replaced by a desired number of increments and the pin allowed to engage in a new hole.

Figure 8:
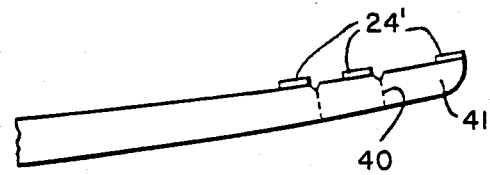
FIG. 8 is a view corresponding to FIG. 7 of a third embodiment.

Turning to FIG. 8 there is shown an alternative embodiment in which the stem is formed with a plurality of longitudinally spaced socket means in the form of claws 24' separated by lines of weakness 40 which allow unwanted end portions of the stem to be broken off. Thus in the embodiment illustrated, the end portion 41 may be broken off at the first line of weakness 40 to shorten the effective length of the carrier by one increment.

We claim:

1. A windscreen wiper blade carrier comprising a bowed main stem including a central portion for engaging a wiper arm and first and second end portions, a first extension arm telescopicly received by said first end portion and a second extension arm telescopicly received by said second end portion, said first and second extension arms being independent of each other and including first and second socket means, respectively, for attachment to a wiper blade, whereby said wiper blade may be engaged only at selected locations between its ends and remain substantially free of contact therebetween, and wherein the distance between said first and second socket means comprises a chord length which can be adjusted by telescopicly adjusting said first and second extension arms with respect to said first and second end portions of said bowed main stem and said wiper blade carrier can thereby accept wiper blades having a plurality of different lengths.

2. The windscreen wiper blade carrier of claim 1, including engaging means for engaging said wiper blade at additional selected locations between said points of attachment of said first and second socket means.

3. The windscreen wiper blade carrier of claim 2, wherein said engaging means comprises support means affixed to said central portion of said bowed main stem, said support means including a central portion, a first end and a second end, and third and fourth socket means located at said first and second ends of said support means for attachment to said wiper blade at said additional selected locations intermediate of said points of attachment of said first and second socket means.

4. The windscreen wiper blade carrier of claim 3, wherein said support means comprises first and second resilient arms whereby lateral bowing of said wiper blade is resisted and a resilient force is provided so as to press said wiper blade against a windscreen between the ends thereof.

5. The windscreen wiper blade carrier of claim 1, wherein said first and second extension arms have generally U-shaped cross-sections comprising a base portion and a pair of side wall portions defining a channel portion therebetween.

6. The windscreen wiper blade carrier of claim 3, wherein said side walls of said first and second extension arms include tapered end portions.

7. The windscreen wiper blade carrier of claim 1, wherein said bowed main stem has a generally U-shaped cross-section comprising a base portion and a pair of side wall portions defining a channel portion therebetween, with said channel portion being open to said chord.

8. The windscreen wiper blade carrier of claim 7, wherein said central portion of said bowed main stem includes a central apperture for receiving a pin member for attachment to a wiper arm.

9. The windscreen wiper blade carrier of claim 8, including support means affixed to said central portion of said bowed main stem, said support means including a central portion, a first end and a second end, and third and fourth socket means located at said first and second ends of said support means for attachment to said wiper blade at additional selected locations intermediate of said points of attachment of said first and second socket means, said support means further comprising a pair of parallel web members at said central portion formed to seat within said central portion of said bowed main stem including said central apperture, a first spring arm associated with said first end of said support means and a second spring arm associated with said second end of said support means.

10. The windscreen wiper blade carrier of claim 9, wherein each of said pair of parallel web members includes a recessed portion formed for snap engagement with said pin member so as to retain said support member within said central portion of said bowed main stem.

11. The windscreen wiper blade carrier of claim 1, including locking means for locking said first and second extension arms in a plurality of predetermined positions with respect to said bowed main stem.

12. The windscreen wiper blade carrier of claim 11, wherein said locking means comprises corresponding rows of equally spaced projections and recesses, whereby each of said plurality of predetermined positions of said first and second extension arms with respect to said bowed main stem are determined by a pair of said corresponding projections and recesses.

13. The windscreen wiper blade carrier of claim 12, wherein said plurality of projections are associated with said first and second ends of said bowed main stem and said plurality of corresponding recesses are associated with said first and second extension arms.

14. The windscreen wiper blade carrier of claim 11, wherein said locking means comprises a pair of movable pin members projecting from the first and second end portions of said bowed main stem and a corresponding plurality of apertures located on said first and second extension arms, whereby said plurality of predetermined position of said first and second extension arms with respect to said bowed main stem are determined by one of said plurality of apertures into which said pin members are inserted.

* * * * *